(12) United States Patent
Werner et al.

(10) Patent No.: US 10,670,108 B2
(45) Date of Patent: Jun. 2, 2020

(54) HYDRAULICALLY DAMPING BEARING

(71) Applicant: VIBRACOUSTIC GMBH, Darmstadt (DE)

(72) Inventors: Philipp Werner, Luneburg (DE); Hilrich Kardoes, Winsen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 15 days.

(21) Appl. No.: 16/079,191

(22) PCT Filed: Mar. 13, 2017

(86) PCT No.: PCT/EP2017/055804
§ 371 (c)(1),
(2) Date: Aug. 23, 2018

(87) PCT Pub. No.: WO2017/162459
PCT Pub. Date: Sep. 28, 2017

(65) Prior Publication Data
US 2019/0063544 A1 Feb. 28, 2019

(30) Foreign Application Priority Data
Mar. 24, 2016 (DE) .................. 10 2016 105 633

(51) Int. Cl.
*F16F 13/14* (2006.01)

(52) U.S. Cl.
CPC .... *F16F 13/1463* (2013.01); *F16F 2224/025* (2013.01); *F16F 2234/02* (2013.01)

(58) Field of Classification Search
CPC .............. F16F 13/1463; F16F 13/1427; F16F 2224/025; F16F 2234/02; F16F 13/14; F16F 13/1409; F16F 13/1481
See application file for complete search history.

(56) References Cited

U.S. PATENT DOCUMENTS

| 4,611,782 A | 9/1986 | Ushijima et al. | |
| 4,838,529 A * | 6/1989 | Orikawa | F16F 13/1427 267/140.12 |

(Continued)

FOREIGN PATENT DOCUMENTS

| DE | 4305173 C2 | 3/1998 |
| DE | 19732123 A1 | 1/1999 |

(Continued)

OTHER PUBLICATIONS

International Search Report, PCT/EP2017/055804, dated May 19, 2017.

*Primary Examiner* — Xuan Lan Nguyen
(74) *Attorney, Agent, or Firm* — Fishman Stewart PLLC

(57) ABSTRACT

A hydraulically damping mount includes amount core and an outer tube. In an embodiment, the mount core is supported on the outer tube via a mount spring of an elastomeric material, and the mount spring divides the space formed between the mount core and the outer tube into at least two fluid-filled chambers that are in fluid communication with each other via at least one damping channel and at least one decoupling channel. In an embodiment, at least one torsion-resistant decoupling device is movable back and forth by fluid flows and is arranged in the at least one decoupling channel. In an embodiment, the decoupling device is formed so that during a fluid induced movement of the decoupling device its inflow sides always face the fluid flows.

20 Claims, 7 Drawing Sheets

(56) References Cited

U.S. PATENT DOCUMENTS

| | | | | |
|---|---|---|---|---|
| 4,896,868 A | * | 1/1990 | Thelamon | F16F 13/1427 267/140.12 |
| 5,054,752 A | * | 10/1991 | Tabata | F16F 13/1463 180/312 |
| 5,286,011 A | * | 2/1994 | Strand | F16F 13/20 267/140.12 |
| 5,509,643 A | * | 4/1996 | Carstens | F16F 13/14 267/140.11 |
| 6,318,708 B1 | * | 11/2001 | Wolf | F16F 9/3415 267/140.12 |

FOREIGN PATENT DOCUMENTS

| | | |
|---|---|---|
| DE | 19959391 A1 | 7/2001 |
| EP | 0164887 A2 | 12/1985 |
| EP | 0304349 A1 | 2/1989 |
| EP | 2253863 A2 | 11/2010 |
| WO | 2012002402 A1 | 1/2012 |

\* cited by examiner

HYDRAULICALLY DAMPING BEARING

CROSS-REFERENCE TO RELATED APPLICATION

This application is a National Stage Patent Application of International Patent Application No. PCT/EP2017/055804, filed Mar. 13, 2017, which claims the benefit of German Application Ser. No. 10 2016 105 633.2, filed Mar. 24, 2016, the contents of each are incorporated by reference in their entireties.

TECHNICAL FIELD

The present invention relates to a hydraulically damping mount, including a hydraulically damping mount having a mount core and an outer tube.

BACKGROUND

Hydraulically damping mounts are used in engine vehicles to damp and to cancel occurring vibrations. The hydraulic functions can also be implemented in bushes, which results in fundamental design amendments, however, due to compressed constructions. In particular, such mounts are used as chassis mounts or engine mounts. The fluid-filled chambers are partially limited by elastomeric membranes. Their blowing rigidity significantly contributes to the overall rigidity of the mounts, the dynamic rigidity, in dynamic loading of the mounts.

Decoupling devices serve in mounts of the aforementioned type to lower the dynamic rigidity for high-frequency, low-amplitude excitations. In high-amplitude vibrations the decoupling member closes the inlet opening of the decoupling channels at the decoupling cage. Only then, a significant amount of fluid is pumped through the damping channel, thereby causing dampening of occurring vibrations.

DE 43 05 173 C2 discloses a hydraulically damping mount bush with hollow-cylindrical mount core and an outer sleeve. The mount core is supported by the mount spring of an elastomeric material. The space between the mount springs has two fluid-filled chambers separated by supporting studs. The chambers are connected with each another by a damping channel and a decoupling channel. The decoupling channel has a decoupling cage receiving a freely movable spherically shaped decoupling member.

EP O 304 349 A1 discloses an elastic joint comprising two fluid-filled chambers which are connected to each other by a first channel and a second channel. The second channel has spherically shaped closing means capable of moving in the second channel between two end points having reduced channel diameters and capable of closing the second channel if the closing means are closely fitted on one end point. Thereby, the diameter of the closing means is barely smaller than the diameter of the second channel.

DE 197 32 123 A1 discloses a sleeve-shaped hydraulically damping radial rubber mount with at least two hydraulic working compartments connected with each other via a throttle channel and via a bypass channel for damping shock amplitudes. A decoupling member comprised of a decoupling cage and an inserted elastomeric loose piece is introduced into the bypass channel. The elastomeric loose piece thereby bears at most loosely with all its side surfaces on the surrounding wall surfaces of the decoupling chamber. The resonance of the mount for low amplitudes can therefore be shifted to a frequency range around 200 Hz, while in the presented example, the mount has a resonance of around 40 Hz for high amplitudes.

However, the non-spherically shaped decoupling members of the known mounts are formed so that they can tilt or tip during operation. Thus, the operational safety and function of the mounts at low amplitudes is guaranteed only to a limited degree.

In addition, hydraulic simulations show that the resonance frequency in a hydraulically active channel is higher the less mass vibrates in the channel, i.e. the shorter the channel is relative to its cross section. For particularly good results, the cross section of the decoupling channel is to be maximized, and its length or vibrating mass is to be minimized. However, the minimal length of the decoupling channel is limited by the width of the supporting studs. Maximizing the cross sections of the decoupling channel is directly linked to the construction type of the mount bushing. Thus, the available construction space is defined by a portion of the guide cage which externally limits and fixes the supporting lug, and the outer pipe. Typically, the construction space has a very small height in radial direction. Thus, spherical decoupling members do not optimally utilize the mostly flat, longitudinal cross section between the outer sleeve and the cage.

Therefore, the object of the invention is to provide a hydraulically damping mount having a small dynamic rigidity at low amplitudes and an improved operational safety.

To solve this object, it is proposed in the mount of the previously mentioned type to form the decoupling device so that its inflow sides always face the fluid flows during a fluid-induced movement of the decoupling device.

SUMMARY

The present invention relates to a hydraulically damping mount, including a hydraulically damping mount having a mount core and an outer tube, whereby the mount core is supported by the outer tube via a mount spring of an elastomeric material, whereby the mount spring divides the space formed between the mount core and the outer tube into at least two fluid-filled chambers which are in fluid communication with each other via at least one damping channel and at least one decoupling channel, whereby at least one torsion-resistant and plate-shaped decoupling device movable back and forth by fluid flows is disposed in the decoupling channel, and whereby the decoupling device is designed in such a way that during a fluid-induced movement of the decoupling device, its inflow sides always face the fluid flows.

The invention is based on the realization that a hydraulically damping mount of the mentioned type has a high operational safety, since the decoupling device is insensitive to tipping and/or tilting during operation. Furthermore, the vibrating mass can be set in the decoupling channel via the density of the decoupling device so that the dynamic rigidity of the mounts can be tuned to higher frequencies at low amplitudes. Moreover, the decoupling device is preferably formed so that vibrations up to 60 Hz (e.g. rolling noise) are decoupled up to 200 Hz in individual cases. The decoupling device is formed so that it utilizes the available space in the cross section better than a spherically formed decoupling device.

According to the present invention the decoupling device can also be referenced as a decoupling member.

Preferred embodiments of the hydraulically damping mounts are subject of the appended claims.

In a preferred embodiment the decoupling device has a width in the direction of the fluid flows and a height transverse to the direction of the fluid flows, the width of the decoupling device being at least as large as the height of the decoupling device, the width of the decoupling device being preferably at least twice as large as the height of the decoupling device. Further preferred, the decoupling device has a height transverse to the direction of the fluid flows and a length transverse to the direction of the fluid flows, the length of the decoupling device being larger than the height of the decoupling device, whereby the length of the decoupling device is preferably at least three times as large as the height of the decoupling device. Therefore, the decoupling device can have a shape of cylinder and/or a cuboid and a plate formed member, respectively, aligned transversely to the direction of the flow.

In a preferred embodiment, the decoupling channel has a width transverse to the direction of the fluid flows, and the decoupling device has a length transverse to the direction of the fluid flows, whereby the length of the decoupling device is equal to or slightly shorter than the width of the decoupling channel. Thereby, the decoupling device is highly insensitive towards tilting and/or turning during operation. In addition, in its end position the decoupling device seals the inlet openings so that no fluid is able to flow via the decoupling channel.

In a preferred embodiment, the decoupling device has a width in the direction of the fluid flows and the decoupling channel has a length in the direction of the fluid flows, whereby the ratio of the width of the decoupling device to the length of the decoupling channel is between approximately 0.3 and approximately 1.0, preferably between approximately 0.45 and approximately 0.75. The length of the decoupling channel is thereby generally defined by the distance between the chambers. However, by introducing the decoupling device, the vibrating mass in the decoupling channel can be changed without significantly changing the decoupling channel's geometry. Preferably, the decoupling device almost entirely fills out an interior space of the decoupling channel. The resonance frequency of the decoupling channel is primarily determined by the cross section of the decoupling channel and the vibrating mass in the decoupling channel. For a given length and a given cross section of the decoupling channel, the vibrating mass which is generally almost equal to the mass of the vibrating fluid column in the decoupling channel, can be changed by the introduced decoupling device. Depending on the form of the decoupling device it is possible to adjust the vibrating mass in the decoupling channel over a wide range. Thus, for instance, for a decoupling cage in which the distance between the first chamber and the second chamber is 20 mm, it is possible via a decoupling device from steel with a length of 15 mm to set a vibrating mass which would be equivalent to a decoupling channel length or a vibrating fluid column of approximately 120 mm. For instance, by taking the same decoupling device and forming it as an integral foam with a density of 0.4 g/cm$^3$, the vibrating mass could be almost halved as compared to a pure fluid column with the length of 20 mm. Thus, the application of such a decoupling device with low density provides a similar effect as if the natural length of the decoupling channel of 20 mm was reduced to 11 mm, although the geometry of the decoupling channel itself is not changed.

In a preferred embodiment, a decoupling cage is introduced into the decoupling channel into which the decoupling device is received. Preferably, the decoupling cage ensures a precise placement of the decoupling device into the decoupling channel and improves the ability to close the through-openings through the decoupling device. The resonance frequency of the decoupling channel can also be changed by introducing the decoupling cage into the decoupling channel. The decoupling cage has a width in the direction of the fluid flows and a cross section. The resonance frequency of the decoupling channel into which a decoupling cage is introduced, can be adjusted according to the design of the decoupling channel.

Given the geometry of the decoupling channel, the vibrating mass in the decoupling channel can be set via the density of the decoupling device for effective tunability of the hydraulic damping mount. If in the decoupling channel a vibration of a pure liquid column having a given cross section and a liquid column length corresponding to the channel length is assumed in the model representation, then, for example, by introducing a low-density decoupling the virtual length of the decoupling channel can be shortened. Furthermore, contractions in the decoupling channel should be introduced, in particular, at the beginning and the end of the decoupling channel or the decoupling cage in the direction of the fluid flows to cause a good sealing of the decoupling channel by the decoupling device in its end position.

In a further preference, the decoupling device almost entirely fills out the interior space of the decoupling cage.

Preferably, the interior space of the decoupling cage has a width in the direction of the fluid flows. The tunability of the frequency position improves with the ratio of the length of the decoupling channel to the width of the decoupling device.

In a preferred embodiment, the decoupling cage is closely fitted onto the outer contour of the hydraulically damping mount and fills out the decoupling channel entirely. Thus, the vibrating decoupling device, disposed inside the decoupling cage, can fill out a portion of the vibrating volume of the decoupling channel to achieve the largest possible tunability of the decoupling behavior. The outer walls of the decoupling cage have through-openings so that the fluid through the decoupling channel can flow through the decoupling cage.

In a preferred embodiment the decoupling cage and/or the decoupling device has a curvature adjusted to the outer tube and/or the mount core.

In a preferred embodiment the decoupling device is made of a metal. In a further preference, the decoupling device is made of steel or aluminum.

In a preferred embodiment, the decoupling device is made of plastic, in particular of integral polymer foam or a polymer compound filled with filling elements. An integral foam has a low average volume weight and at the same time a high mechanical robustness. Preferably, the integral polymer foam has a volume weight between approximately 0.1 g/cm$^3$ and approximately 1.0 g/cm$^3$, in particular between approximately 0.3 g/cm$^3$ and approximately 0.5 g/cm$^3$. The filling elements can be formed as hollow glass spheres. A polymer filled with hollow glass spheres has a low density and at the same time a high mechanical robustness. The decoupling device forming a polymer filled with hollow glass spheres preferably has an average density between approximately 0.6 g/cm$^3$ and approximately 1.1 g/cm$^3$, in particular, between approximately 0.7 g/cm$^3$ and approximately 0.9 g/cm$^3$. Further, the filling elements can be glass fibers, glass spheres and/or metal particles. Such filling elements have a high density, so that a polymer compound filled with them also has a high density. Preferably, the filling level of such filling elements in the polymer compound is between 20 vol % and 80 vol %, preferably 40 vol % to 60 vol %.

In a preferred embodiment, the decoupling device is made of a torsion-resistant material. Thereby, the decoupling device is insensitive to a twist during operation.

In a preferred embodiment, the decoupling device is formed as a hollow body.

In a preferred embodiment, the decoupling device is made of a metal having closed surface and a high porosity in its interior space. The surface of the decoupling device is thereby formed in a fluid-sealing and diffusion-stable way.

In a preferred embodiment, the density of the decoupling device is smaller or equal to the density of the fluid. The vibrating mass in the decoupling channel or the virtual length of a vibrating fluid column in the conceptual model can be purposefully reduced. Because of a reduced vibrating mass the decoupling channel is effective up to high frequencies.

In a preferred embodiment, the density of the decoupling device is larger or equal to the density of the fluid.

In a preferred embodiment, a window tube is introduced into the mount spring, the window tube being formed by at least two rings connected to each other via a bar, whereby the decoupling channel is formed between the bar and the outer tube.

In a preferred embodiment, the decoupling cage is integrated into the window tube. Thus, the decoupling cage is not a separately introduced element, but rather it is formed by the window tube of the mount spring and/or the mount spring itself. Since in this case the decoupling cage is not a separate component, costs of material can be saved. For example, the decoupling cage material is formed uniformly and/or in one piece with the window tube or the mount spring.

In a preferred embodiment, the mount spring and/or the window tube forms a limitation for the movement of the decoupling device. For this purpose, the mount spring or the window tube forms a limitation transverse to the direction of the fluid flows, for instance, in form of a grid similar to a decoupling cage, limiting the movement of the decoupling device in the direction of the fluid flows.

In a preferred embodiment, the decoupling cage has a recess on the side facing in the opposite direction from the mount core. Therefore, the decoupling device thus floats in axial direction in the fluid directly between the window tube and the outer tube; it is, however, limited in the circumferential direction by the decoupling cage.

In a preferred embodiment, the window tube and/or the outer tube has at least one guide bar in circumferential direction and the decoupling device has at least one guide groove in circumferential direction, whereby the at least one guide bar engages the at least one guide groove. Thereby, a self-centering is achieved and a valve effect is supported.

In a preferred embodiment, the surfaces of the decoupling device facing the openings of the decoupling channel or of the decoupling cage are formed so that, in a fastened end position, they fluidly seal the openings of the decoupling channel or of the decoupling cage.

In a preferred embodiment, the decoupling device is formed by a plurality of separate decoupling elements. For example, a plurality of separate decoupling elements can be connected in parallel to be able to tune the decoupling in a more effectively way. The decoupling elements connected in parallel can be formed in a cylindrical shape or by several separate cuboids with rectangular cross sections. However, the cuboid form of the decoupling device can be adjusted to the curvature of the decoupling channels in circumferential direction.

In a preferred embodiment, the plurality of decoupling channels connected in parallel can connect both of the chambers with each other. Thereby, decoupling devices can be provided in each separate decoupling channel. Further, different decoupling devices can be provided in each separate decoupling channel. The different decoupling devices and/or the separate decoupling channels can differ in their spatial dimensions as well as in their shape and therefore in their resonance frequencies.

BRIEF DESCRIPTION OF THE DRAWINGS

Following, the hydraulically damping mount is explained in more detail based on the appended drawings. Hereby schematically show.

DETAILED DESCRIPTION

Figure 1:
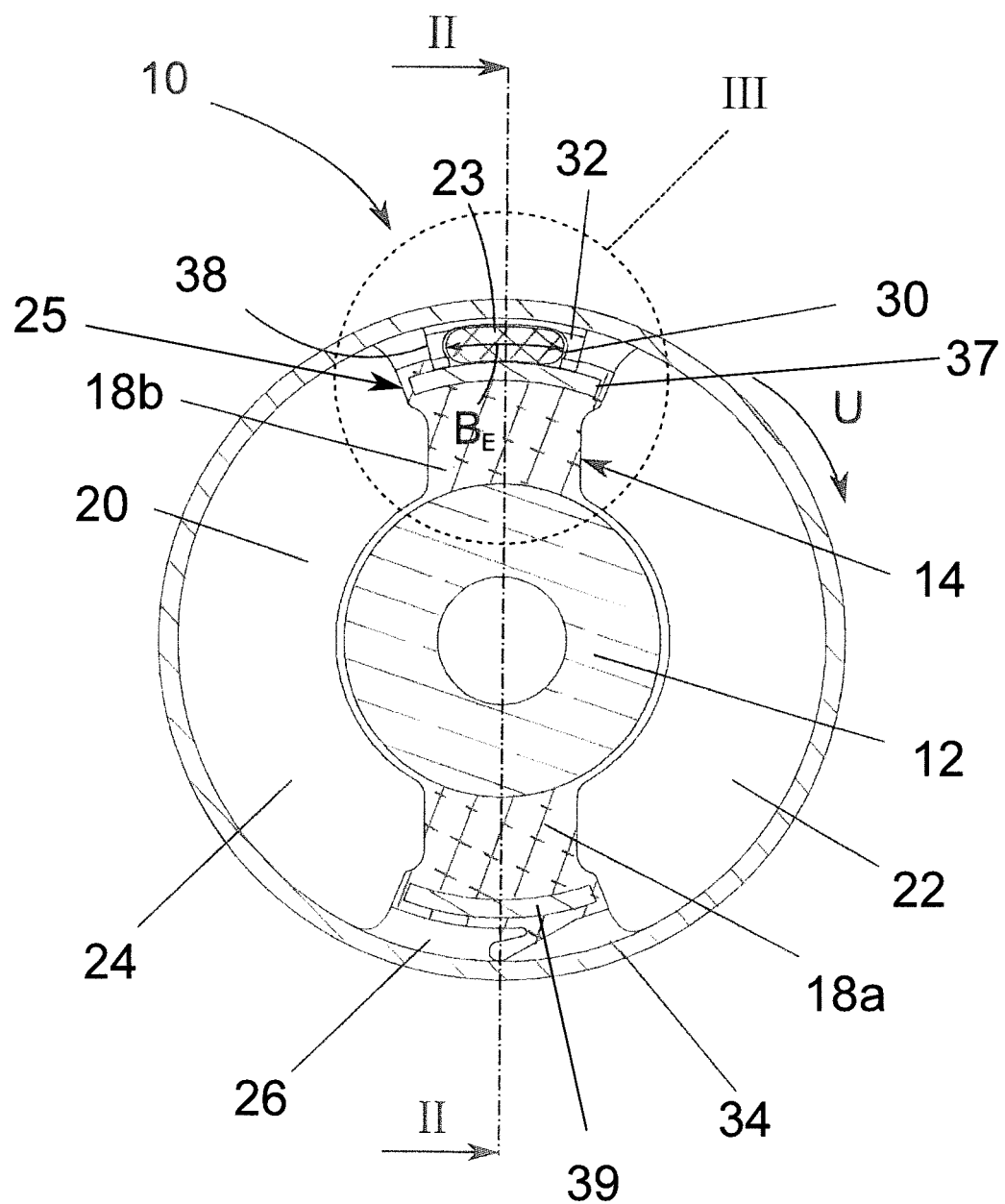
FIG. 1 shows a vertical section through a first embodiment of a hydraulically damping mount.

The embodiment illustrated in FIGS. 1 to 4 of the hydraulically damping mount 10 is formed as a cylindrical mount bush which is used as chassis mounts or suspension mounts.

The mount 10 has a hollow-cylindrical mount core 12 supported by an outer tube 34 via a mount spring 14. Two chambers 20, 22 filled with fluid 24 are formed through two supporting studs 18a, 18b extending in radial direction. The chambers 20, 22 restricted at their ends by elastically inflatable elastomeric membranes (not shown) are in communication with each other via a damping channel 26 and a decoupling channel 30.

Figure 2:
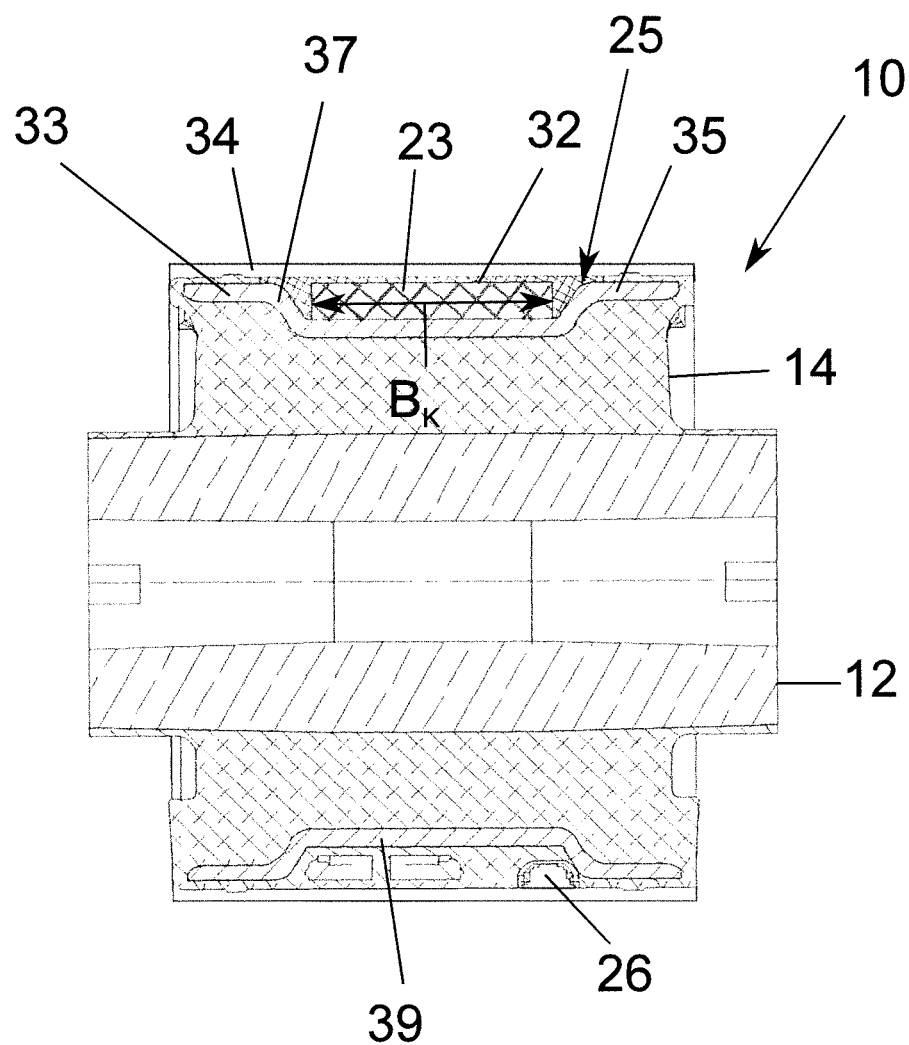
FIG. 2 shows an axial section through the hydraulically damping mount of FIG. 1, taken along line II-II.

Further, a window tube 25 is introduced into the supporting studs 14. The window tube 25 has two rings 33, 35, connected to each other via two opposite bars 37, 39, as seen in FIG. 2. The bar 37 together with the outer tube 34 form a decoupling channel 30.

A decoupling cage 32 is introduced into the decoupling channel 30. Furthermore, the decoupling channel has a length LK in the direction of the fluid flows F and a width BK transverse to the direction of the fluid flows F. For instance, the decoupling cage 32 is formed as a one-piece plastic part and is positioned between the window tube 25, in particular, the bar 37 and the outer tube 34 of the mount spring 14. A decoupling device 23 having a width BE in the direction of the fluid flows F and a length LE transverse to direction of the fluid flows F is provided in the decoupling cage 32, whereby the length of the decoupling device LE is equal to or slightly shorter than the width of the decoupling channel BK.

Figure 3:
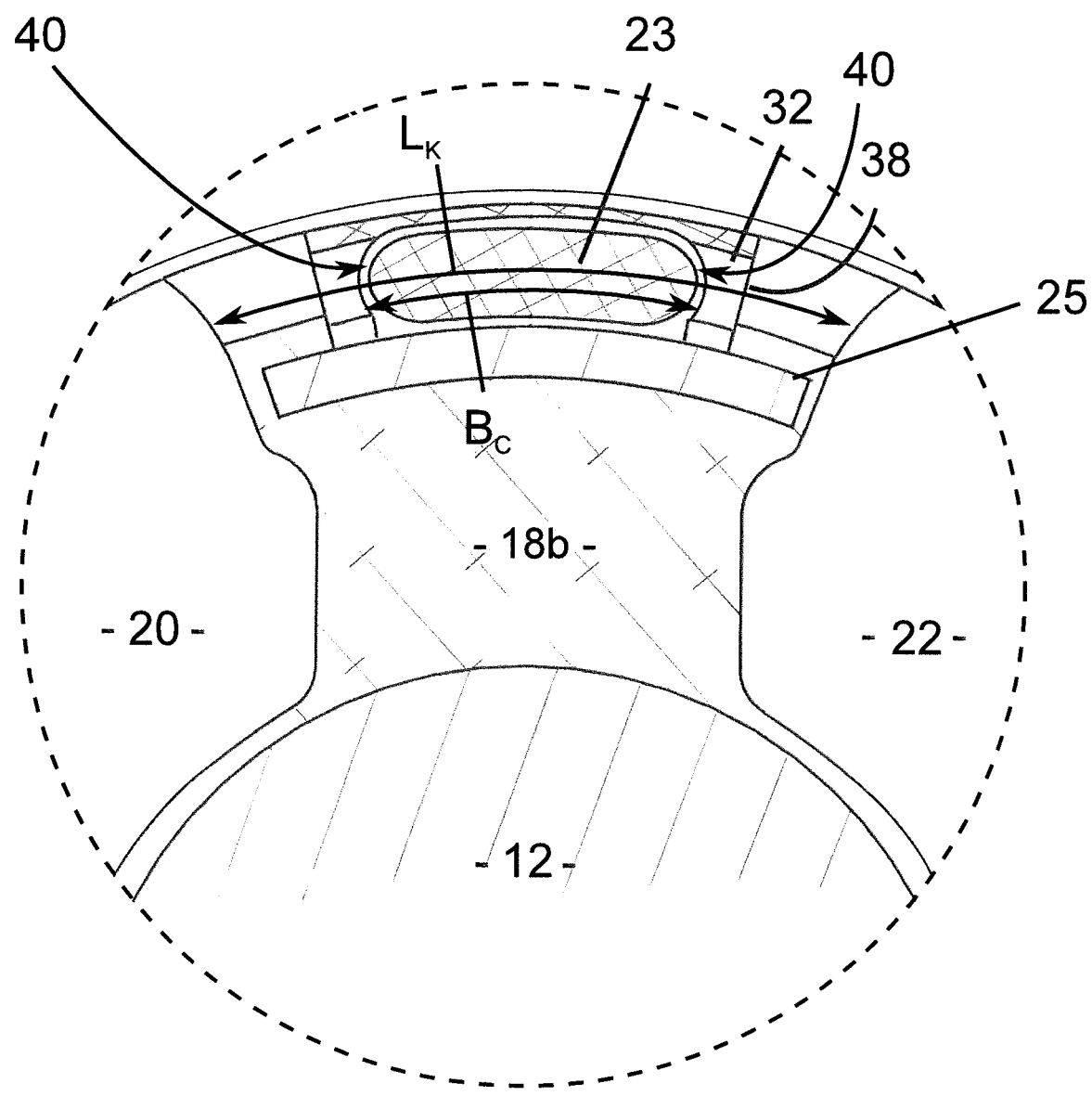
FIG. 3 shows an enlarged illustration of the detail III in FIG. 1.

FIG. 3 shows an enlarged cut-out section of FIG. 1 in the area of the decoupling channel 30. The decoupling device 23 arranged in the decoupling cage 32 is enclosed by fluid 24 from all sides. The decoupling cage 32 has in its interior space a width BC in the direction of the fluid flows F. The tunability of the frequency position increases with the ratio of the width of the decoupling device BE to the length of the decoupling channel LK.

Figure 4A:
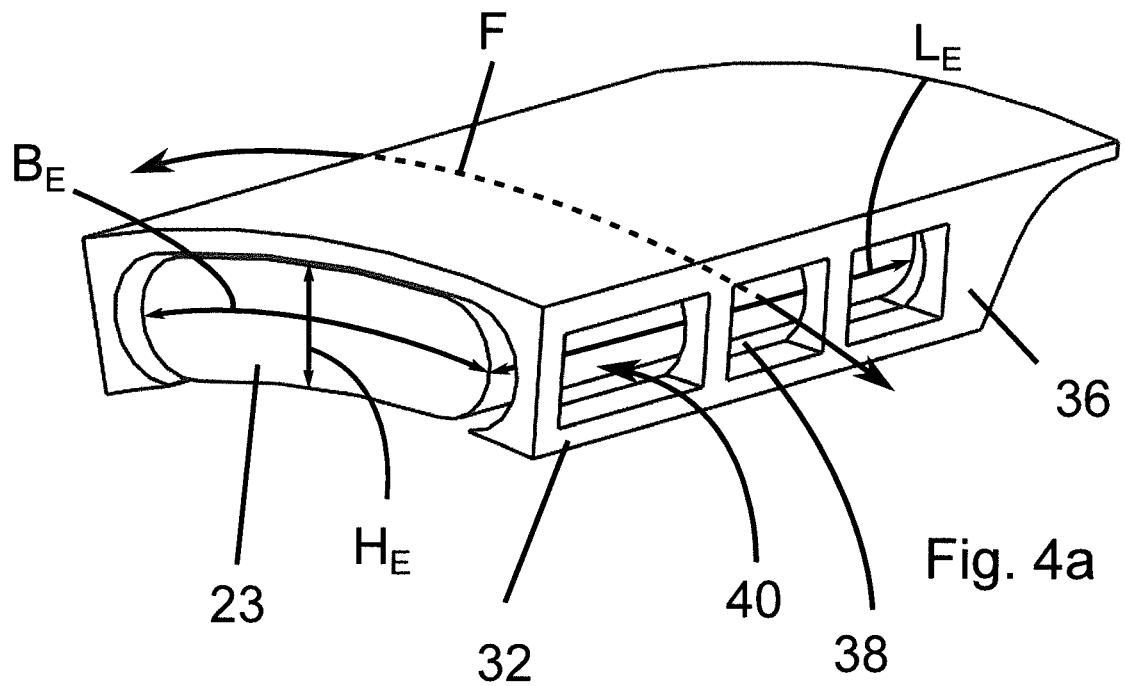
FIG. 4 shows a perspective view of a decoupling cage with a decoupling device in an open position.
FIG. 4b shows a perspective view of a decoupling cage with a decoupling device in a closed position.

As is particularly apparent from FIG. 4a and b, the decoupling cage 32 has end-side grid walls 36, on which flow-through openings 38 are provided. A decoupling device 23 which almost entirely fills out the interior space of the decoupling cage 32 is received with a free path in circumferential direction U in the decoupling cage 32. Thereby, the deflection of the decoupling device 23 is limited by the decoupling cage 32. The free path of the decoupling device 23 is set and its limit amplitude is defined via the clearance between the decoupling device 23 and the grid wall 36 of the decoupling cage 32.

The decoupling cage 32 and/or the decoupling device 23 can be manufactured as separate components and are thus configurable undependably from the vulcanized mount spring 14. Furthermore, the decoupling cage 32 can be integrated into the mount spring 14 and, in particular, into the window tube 25 and there, in particular, into the bar 37.

The decoupling device 23 is made of a polymer integral foam, for instance, thermo-plastic or thermosetting polyurethane, polyetherimide or polyethersulphone. Inexpensive Polystyrol can also be applied if the surface thickness is adjusted so that a reliable diffusion barrier is generated and the thermic and mechanic loads acting upon the decoupling device 23 are not too high. In principal all polymeres that forming a diffusion-tight surface with respect to fluid 24 and dimensionally stable at the present temperatures as well as at the present pressures and mechanical loads, such as when hitting the grid walls 36, are suitable. The decoupling device 23 has a closed robust surface and a high porosity inside. The decoupling device 23 can have a smaller density than the fluid 24 and hence a smaller mass inertia. Thus, the decoupling device 23 in the decoupling channel 30 can follow the oscillating fluid flow up to high frequencies. The decoupling device 23 can also have a higher density than the fluid 24 to allow a decoupling at low frequencies. Therefore, the decoupling device can be formed of metal of plastic. Moreover, the decoupling device can be formed as a hollow body.

Figure 4B:
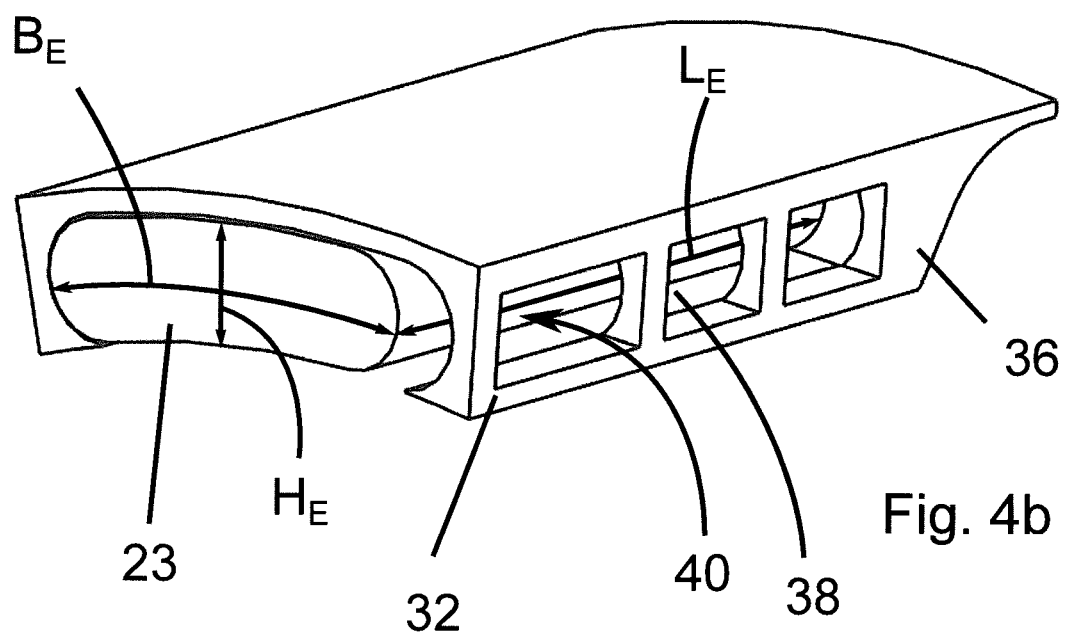

The decoupling device 23 has a height HE transverse to the direction of the fluid flows F, as illustrated in FIGS. 4a and 4b. The decoupling device 23 has a width BE in the direction of the fluid flows F. Moreover, the decoupling device 23 has a length LE transverse to the direction of the fluid flows F. Thereby, the width BE can be more than twice the size of the height HE. Moreover, the axial length LE can be more than three times as large as its height HE. The vibrating mass in the decoupling channel 30 can be set via the special construction of the decoupling device 23 for effective tunability of the hydraulically damping mount 10. Thus, it is possible to adjust the vibrating mass in the decoupling channel 30 over a wide range and thus to set the resonance frequency of the decoupling channel. Thereby, inflow sides 40 of the decoupling device 23 always face the fluid flows F during a fluid induced movement, so that the decoupling device 23 is insensitive to tilting and/or twisting during operation.

The decoupling device 23 is primarily formed plate-like and has a rectangular cross section in the direction of the fluid flows F. Furthermore, the decoupling device 23 has a curvature adjusted to the decoupling cage 32, which itself follows the curvature of the outer tube 34. The decoupling device 23 almost entirely fills out the interior space of the decoupling cage 32. Hereby, the vibrating mass in the decoupling channel 30 can be maximally tuned. The outer contour of the decoupling device 23 is adjusted to the contour of the inner side of the grid wall 36. Hereby, the surfaces engage each other in a self-centering way, thereby sealing the decoupling channel 30.

The operating principle of the decoupling channel 30 is to be explained based on the FIGS. 4a and 4b.

FIG. 4a shows the position of the decoupling device 23 in the central position. If the mount 10 is excited by a vibration amplitude, a fluid exchange between both of the chambers 20, 22 takes place. Fluid 24 flows alternately into the decoupling channel 30 and thus through the flow-through openings 38 into the inner space of the decoupling cage 32, fills up the decoupling device 23 with the fluid column and exits again through the opposite flow-through openings 38. As of a limit amplitude, the decoupling device 23 finally hits the limiting grid walls 36 alternately on both sides and thus alternately closes the flow-through openings 22 depending on the direction of the flow. One of these closed states is illustrated in FIG. 4b. The decoupling channel 30 is closed as of a defined amount of exchanged fluid volume. Now, additional exchange of fluid in the same flow direction within the same load amplitude takes place exclusively via the damping channel 26. As of this limit amplitude, damping work is carried out proportionally and the dynamic rigidity of the mounts increases.

The limit amplitude is selected so that the acoustically relevant low amplitudes do not require an exchange of fluid via the damping channel. The decoupling device 23 does not hit both of the opposite grid walls 36 and vibrates largely in an unrestricted way with the fluid column in the decoupling cage 32. Hereby, a simple exchange of fluid between the chambers 20, 22 is guaranteed and the elastomeric membrane limiting the chambers 20, 22 will not be inflated. The result is a smaller dynamic rigidity, so that the acoustic transmission properties of the mounts 10 are improved.

However, at high amplitudes most of the exchange of the fluid between the chambers 20, 22 has to take place via the damping channel 26. The supporting studs 14 limiting the chambers 20, 22 will be inflated in a stronger way, thus significantly contributing to the overall rigidity of the mounts 10. Therefore, the dynamic rigidity of the mounts 10, dominated by static rigidity and the blowing rigidity of the mount spring 14 is high. Preferably, the decoupling device 23 is tuned in such a way that an alternating hitting of the decoupling device 23 against both of the opposite grid walls 36 takes place via a vibration-induced exchange of fluid between the chambers as of a limit amplitude between 0.01 mm and 0.05 mm.

A second embodiment of the hydraulically damping mount 10' illustrated in FIGS. 5 and 6 will be explained subsequently. The description uses the same reference numbers as in the first embodiment for the same or functionally equal parts.

As in the first embodiment, the illustrated hydraulically damping mount 10' is shown as a cylindrical mount bush. The mount 10' has a hollow-cylindrical mount core 12 supported on the outer pipe 34 via a mount spring 14. Two chambers 20, 22 filled with fluid 24 are formed through two in radial direction extending supporting studs 18a, 18b of the mount spring 14. The chambers 20, 22 are connected with each other via a damping channel 26 and a decoupling channel 30. The chambers 20, 22 are limited on their end sides by an elastically inflatable elastomeric membrane (not shown).

In contrast to the first embodiment no decoupling cage 32 is introduced into the decoupling channel 30. Rather, the decoupling device 23 is received by a recess formed into the mount spring 14. The free path of the decoupling device 23 is set and its limit amplitude is defined by the clearance between the decoupling device 23 and the mount spring 14.

The decoupling device 23 has two guide grooves 42a, 42b extending in circumferential direction and spaced in axial direction from one another. Moreover, the window tube 25 has two guide bars 44a, 44b extending in circumferential direction and radially outwards on the upper side facing the decoupling device 23. These guide bars 44a, 44b engage the guide grooves 42a, 42b. The interaction between the guide groove 42a, 42b and the guide bars 44a, 44b provides a continuous guidance and centering for the decoupling device 23.

The decoupling device 23 of the second embodiment has the same material properties as the decoupling device 23 of the first embodiment.

Figure 5:
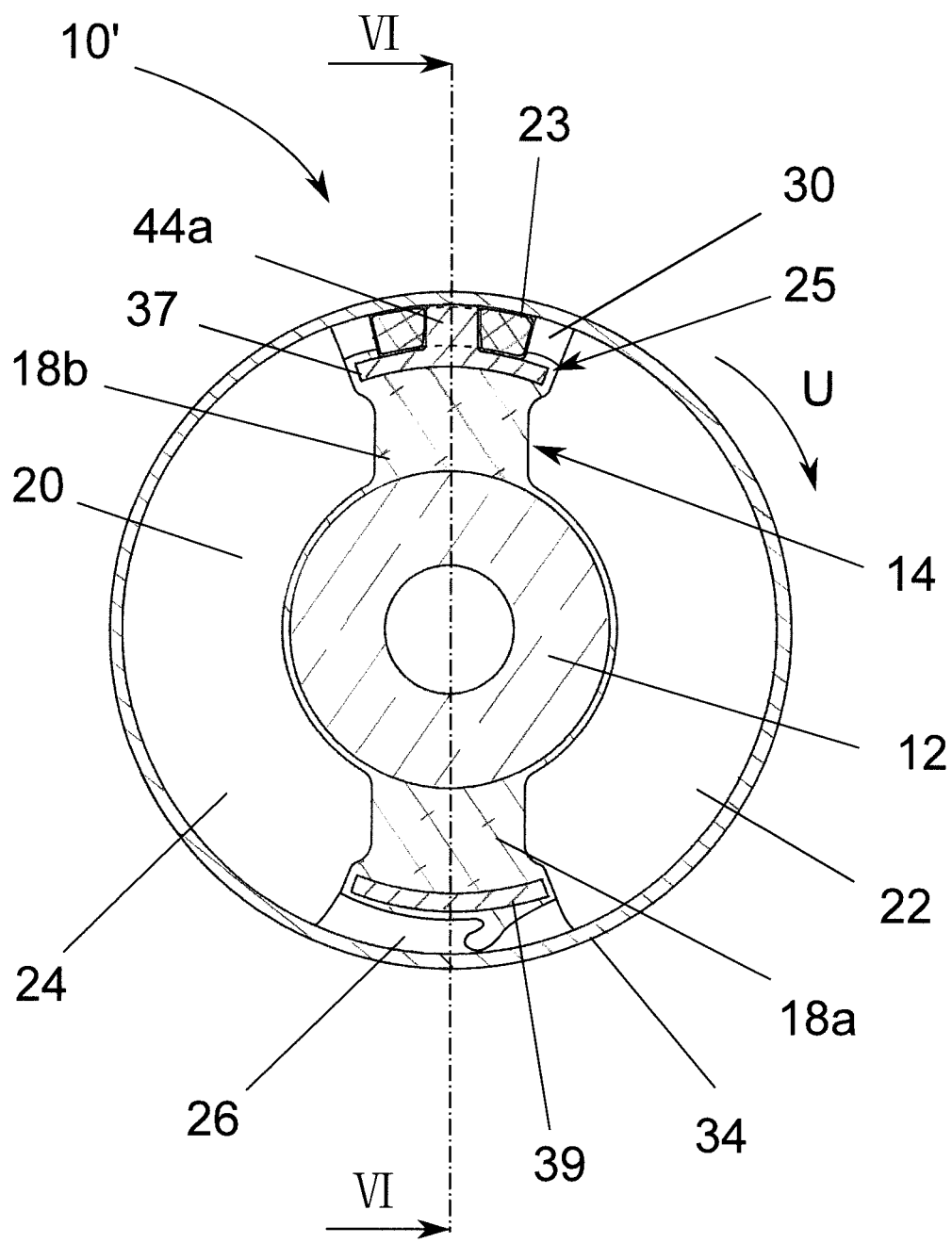
FIG. 5 shows a vertical section through a second embodiment of a hydraulically damping mount without a decoupling cage.
Figure 6:
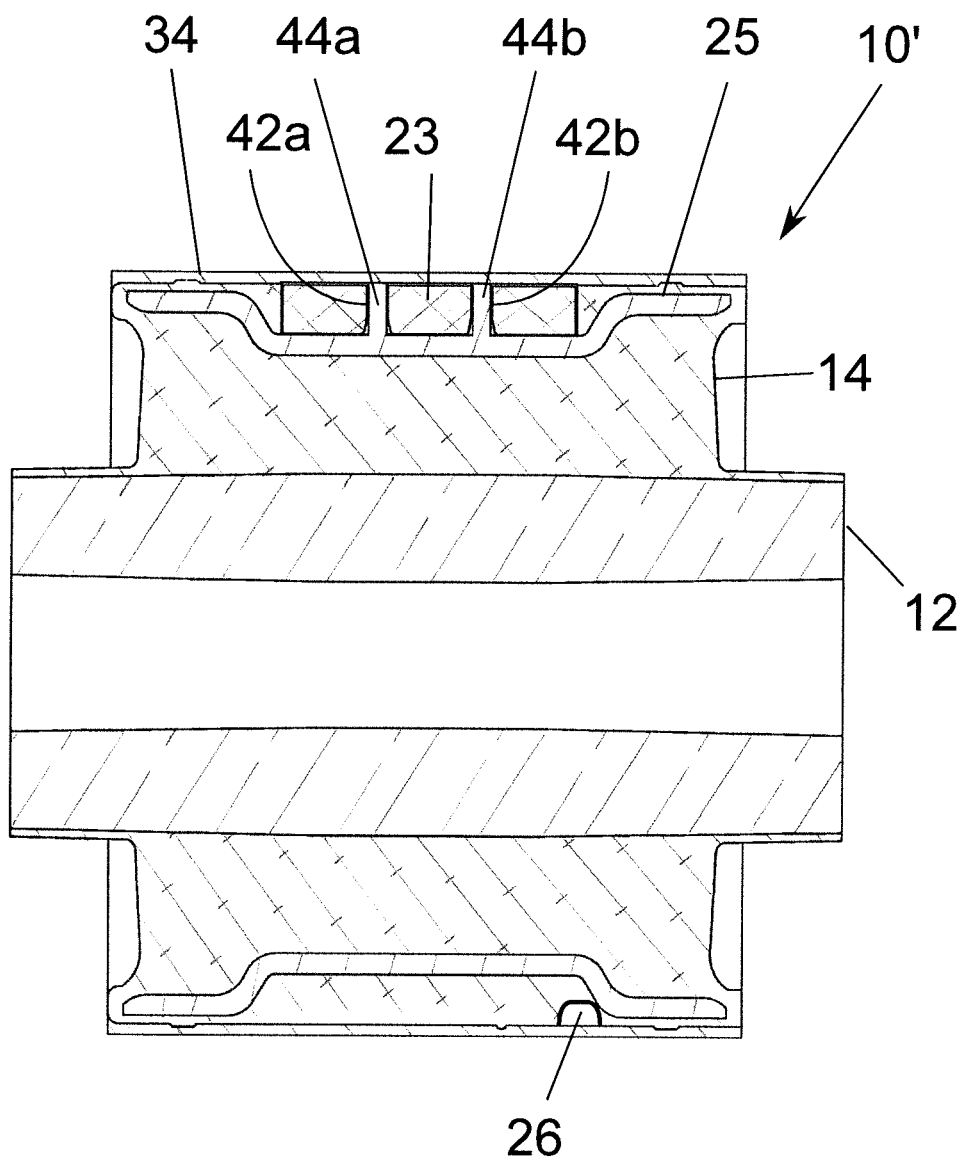
FIG. 6 shows an axial section through the hydraulically damping mount of FIG. 5, taken along line VI-VI.

As is seen in FIG. 5, the decoupling device 23 has a curvature adjusted to the outer tube 34. The decoupling device 23 almost entirely fills up the space defined by the outer tube 34, the supporting studs 18a, 18b, and the outer tube 34. Hereby, the tunability of the vibrating mass in the decoupling channel 30 at constant channel geometry is maximal.

The operating principle of the decoupling device 23 of the mount 10' corresponds to the previously described operating principle of the decoupling device 23 according to the first embodiment.

Figure 7:
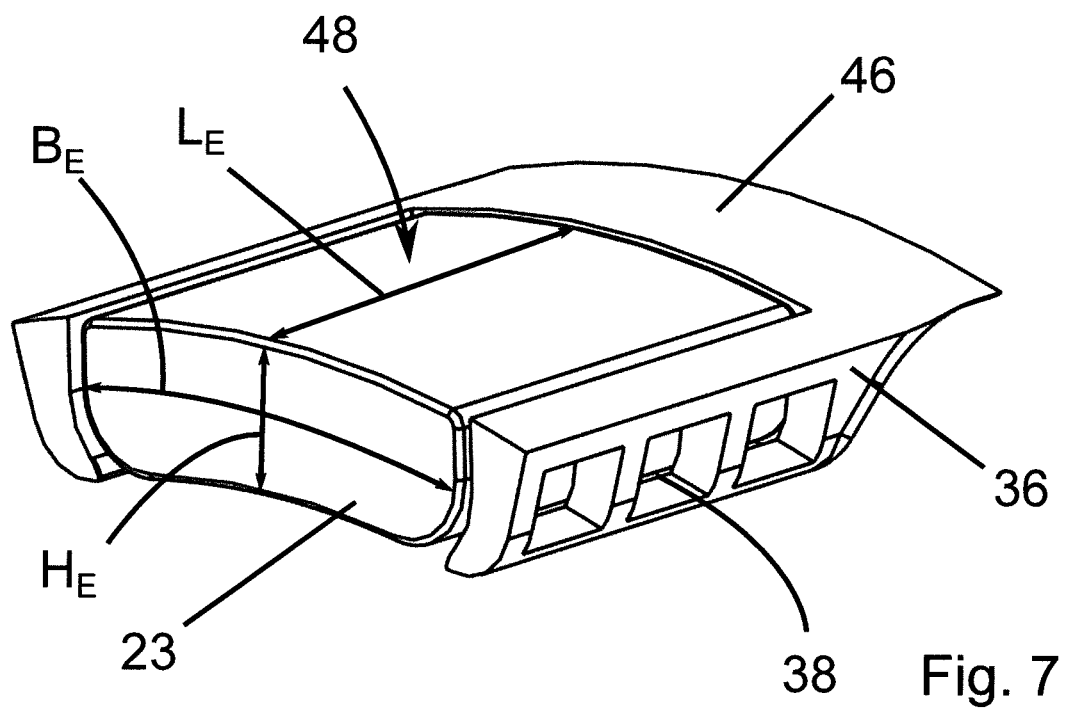
FIG. 7 shows a perspective view of a second embodiment of a decoupling cage.

FIG. 7 shows a second embodiment of the decoupling cage 46. The decoupling cage 46 has a recess 48 facing the inner wall of the outer pipe 34.

The decoupling device 23 thus floats in axial direction in the fluid 24 directly between the window tube 25 and the outer tube 34; it is, however, still limited by the decoupling cage 32 in circumferential direction U.

REFERENCE PART LIST 10, 10' hydraulically damping mount
12 mount core
14 mount spring
18a, 18b supporting studs
20 first chamber
22 second chamber
23 decoupling device
24 fluid
25 window tube
26 damping channel
30 decoupling channel
32 decoupling cage
33 ring
34 outer tube
35 ring
36 grid wall
37 bar
38 flow-through openings
39 bar
40 inflow side
42a, 42b guide grooves
44a, 44b guide bars
46 decoupling cage
48 recess $B_E$ width of the decoupling device
$L_E$ length of the decoupling device
$H_E$ height of the decoupling device
$L_K$ length of the decoupling channel
$B_K$ width of the decoupling channel
$B_C$ width of the interior space of the decoupling cages
F direction of the fluid flows
U circumferential direction

The invention claimed is:

1. A hydraulically damping mount having a mount core and an outer tube, the mount core being supported on the outer tube via a mount spring of an elastomeric material, wherein the mount spring divides the space formed between the mount core and the outer tube into at least two chambers filled with fluid in fluid communication with each other via at least one damping channel and at least one decoupling channel; at least one torsion-resistant, plate-shaped decoupling device movable back and forth by fluid flows is disposed in the at least one decoupling channel; the decoupling device being formed so that during a fluid induced movement of the decoupling device its inflow sides always face the fluid flows; the decoupling device has a height and a length transverse to the direction of the fluid flows and a width in the direction of the fluid flows; and the length and the width of the decoupling device being larger than the height of the decoupling device.

2. The hydraulically damping mount according to claim 1, wherein the width of the decoupling device is at least twice as large as the height of the decoupling device.

3. The hydraulically damping mount according to claim 1, wherein the length of the decoupling device is at least three times as large as the height of the decoupling device.

4. The hydraulically damping mount according to claim 1, wherein the decoupling channel has a width transverse to the direction of the fluid flows, and the decoupling device has a length transverse to the direction of the fluid flows, and the length of the decoupling device is equal to or slightly shorter than the width of the decoupling channels.

5. The hydraulically damping mount according to claim 1, wherein the decoupling device has a width in the direction of the fluid flows and the decoupling channel has a length in the direction of the fluid flows, and the ratio of the width of the decoupling device to the length of the decoupling channel is between approximately 0.3 and approximately 1.0.

6. The hydraulically damping mount according to claim 1, wherein the decoupling device almost entirely fills out an interior space of the decoupling channel.

7. The hydraulically damping mount according to claim 1 wherein a decoupling cage is included in the decoupling channel, and the decoupling device is received in the decoupling cage.

8. The hydraulically damping mount according to claim 7, wherein the decoupling device almost entirely fills out the interior space of the decoupling cage.

9. The hydraulically damping mount according to claim 7, wherein the decoupling cage and/or the decoupling device has a curvature adjusted to the outer tube and/or the mount core.

10. The hydraulically damping mount according to claim 1, wherein the decoupling device is made of a metal.

11. The hydraulically damping mount according to claim 1, wherein the decoupling device is made of a plastic comprising an integral polymer foam or a polymer compound filled with filling elements.

12. The hydraulically damping mount according to claim 1, wherein the decoupling device is formed as a hollow body.

13. The hydraulically damping mount according to claim 1, wherein the decoupling device is made of a metal which has a closed surface and a high porosity in its inside.

14. The hydraulically damping mount according to claim 1, wherein the density of the decoupling device is smaller than or equal to the density of the fluid.

15. The hydraulically damping mount according to claim 1, wherein the density of the decoupling device is larger than or equal to the density of the fluid.

16. The hydraulically damping mount according to claim 1, wherein a window tube formed by two rings connected to one another via at least one bar is introduced into the mount spring, and the decoupling channel is formed between the bar and the outer tube.

17. The hydraulically damping mount according to claim 16, wherein the decoupling cage is integrated into the window tube and/or the mount spring.

18. The hydraulically damping mount according to claim 16, wherein the window tube and/or the outer tube and/or the mount spring has at least one guide bar in circumferential direction and the decoupling device has at least one guide groove in circumferential direction, and the at least one guide bar engages the at least one guide groove.

19. The hydraulically damping mount according to claim 1, wherein the surfaces of the decoupling device facing the openings of the decoupling channel or of the decoupling cage are formed so that they fluidly seal the openings of the decoupling channel or of the decoupling cage in a fastened end position.

20. The hydraulically damping mount according to claim 1, wherein the decoupling device has a width in the direction of the fluid flows and the decoupling channel has a length in the direction of the fluid flows, and the ratio of the width of the decoupling device to the length of the decoupling channel is between approximately 0.45 and approximately 0.75.

* * * * *